United States Patent [19]

Fournier

[11] Patent Number: 5,028,081
[45] Date of Patent: Jul. 2, 1991

[54] CONNECTION FOR PIPES OF COMPOSITE MATERIALS

[75] Inventor: René Fournier, Saint Gaudens, France

[73] Assignee: Societe Nationale Elf Aquitaine, Paris, France

[21] Appl. No.: 315,682

[22] PCT Filed: Jun. 2, 1988

[86] PCT No.: PCT/FR88/00275
§ 371 Date: Apr. 10, 1989
§ 102(e) Date: Apr. 10, 1989

[87] PCT Pub. No.: WO88/09898
PCT Pub. Date: Dec. 15, 1988

[30] Foreign Application Priority Data

Jun. 5, 1987 [FR] France .............................. 87 07908

[51] Int. Cl.⁵ .............................................. F16L 25/00
[52] U.S. Cl. ................................ 285/334.4; 285/353; 285/369; 285/381; 285/423; 285/915
[58] Field of Search ....................... 285/55, 381, 334.2, 285/334.1, 334.4, 353, 369, 423, 915

[56] References Cited

U.S. PATENT DOCUMENTS

| | | | |
|---|---|---|---|
| 549,902 | 11/1895 | Docker | 285/334.1 X |
| 609,030 | 8/1898 | Keller . | |
| 2,261,566 | 11/1941 | Russell . | |
| 2,302,617 | 11/1942 | Little | 285/334.4 X |
| 3,195,927 | 7/1965 | Kimbrell | 285/381 X |
| 3,326,581 | 6/1967 | Wong | 285/381 X |
| 3,336,054 | 8/1967 | Blount et al. | 285/381 X |
| 4,277,091 | 7/1981 | Hunter | 285/55 |
| 4,366,971 | 1/1983 | Lula . | |
| 4,524,996 | 6/1985 | Hunt | 285/381 |

FOREIGN PATENT DOCUMENTS

| | | |
|---|---|---|
| 0163957 | 12/1985 | European Pat. Off. . |
| 1525712 | 11/1941 | Fed. Rep. of Germany . |
| 872706 | 10/1963 | Fed. Rep. of Germany . |
| 1880989 | 10/1963 | Fed. Rep. of Germany . |

Primary Examiner—Dave W. Arola
Attorney, Agent, or Firm—Oblon, Spivak, McClelland, Maier & Neustadt

[57] ABSTRACT

A connection system for pipes made of composite material where each pipe end has an inner sleeve with a radial lip overlapping the pipe end, an outer sleeve attached to each pipe end and a threaded sleeve engaging threads on the outer sleeves to urge the radial lips into engagement.

3 Claims, 1 Drawing Sheet

CONNECTION FOR PIPES OF COMPOSITE MATERIALS

The invention relates to connections for tubular materials of composite materials.

Commerically produced pipes of composite materials for pressures of 2000–3000 psi are connected by threads made in the same material.

The pipes are produced from resins and by fiber-glass filament winding at the ends of which the sealings are assured by tapered threads between the pipe and a connecting sleeve.

The threads on the tube are either machined directly on the material, or remolded after premachining of the end.

Figure 1:
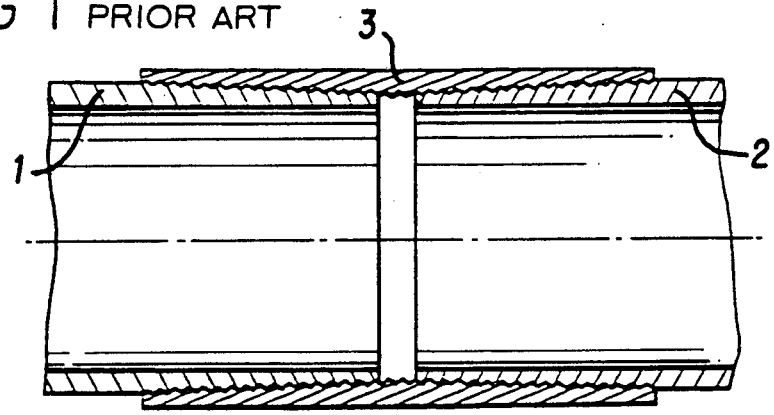

The sleeves are made in two ways: either by simple machining of sections of sufficient length, or remolded on a mandrel machined according to the thread required as is shown in FIG. 1.

When these connection-pipe assemblies are subjected either to ambient temperature, or to temperatures that are higher but lower than the maximum temperature of use of the composites, under stress conditions, numerous deficiencies are revealed in the characteristics of the assembly. The deficiencies essentially appear when these assemblies are subjected to simultaneous stresses of pressure and tension.

The defects and often the ruin of these assemblies are connected to:
 the stresses of tightening to obtain sealing on the tapered thread. These stresses produce shearing strains which alter the wall of the sleeve and cause a cracking and a leak.
 the tension stresses leading to a stripping of the remolded threads and to the breaking of the assembly.

In most cases having as the object special pressure and tension tests, these assemblies were ruined whereas the pipe itself exhibited a good behavior.

This invention has as its object to eliminate these drawbacks by dissociating the sealing zone from the zone of transmission of forces whereas in the materials currently available, these two zones are brought together on the thread of the sleeve of composite material.

A connection for pipes of composite materials according to the invention comprises for each pipe end to be connected:
 an inner jacket that is adjusted to the inside diameter of the pipe and glued,
 an outer jacket that is shrunk-on and glued and a means of connection between the two outer jackets.

Numerous sealing means have been tested including the system having a plastic or metal seal in the shape of an O-ring or the like. Either as a result of complexity of use, or for lack of reliability, these systems have not been retained.

According to a preferred embodiment, the sealing means between the two inner jackets, particularly between their respective ends oriented toward one another, consists of a tapered bearing surface and a spherical part that work with one another.

In some embodiments, the means of connection between the two outer jackets consists of a threaded sleeve whose symmetrical female threads correspond to male threads made on each of the jackets.

In other embodiments, the means of connection between the two outer jackets consists in that a first outer jacket is extended by a female jacket equipped with an inner thread pitch and a second outer jacket is equipped on its end profile with a male thread pitch able to be screwed into the female thread pitch of the first jacket.

Two embodiments are presented below with reference to the accompanying drawings; they are given by way of examples and do not limit the scope of the invention.

Figure 2:
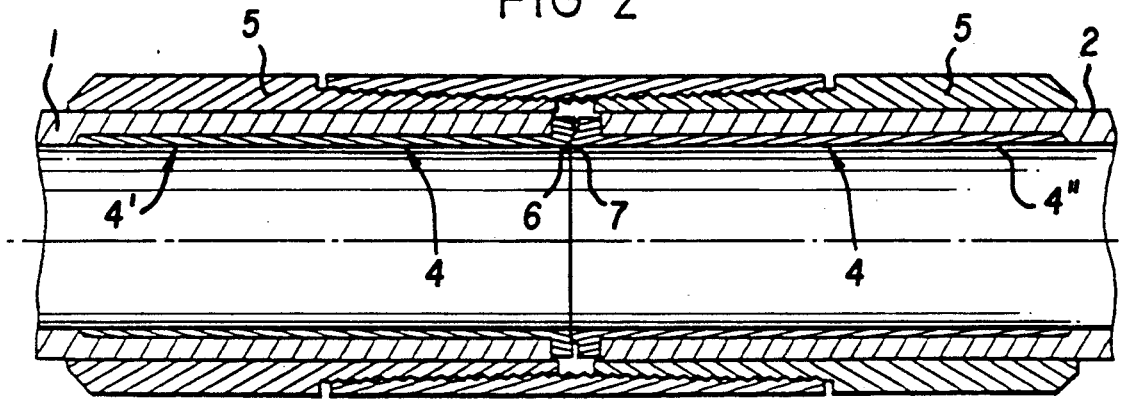
Figure 3:
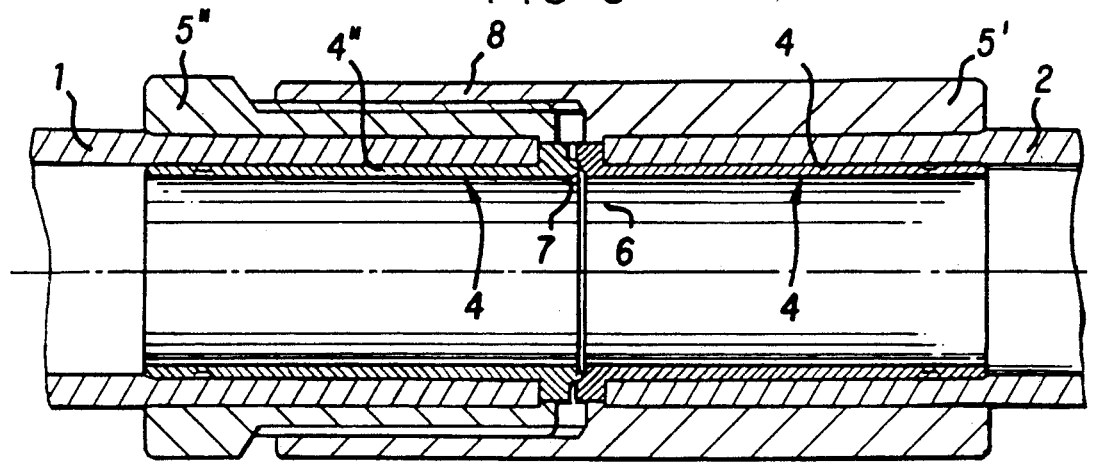

FIG. 1 shows the current state of the art.
FIG. 2 shows an embodiment with connection.
FIG. 3 shows an embodiment with a male connector and a female sleeve.

With reference to FIG. 1, the ends of two pipes 1 and 2 of composite material connected by a sleeve 3 in the same material or in a similar material are distinguished.

The ends of pipes 1 and 2 carry male threads remolded on the pipe and sleeve 3 carries machined or molded female threads. The connections led to breaking as was previously indicated.

FIG. 2 shows a connection according to the invention between two pipes 1 and 2 of composite material. Each end of pipe 1 and 2 is equipped with an inner jacket 4 that is adjusted to the inside diameter of the pipe and glued and with an outer jacket 5 or band that is shrunk-on and glued. A threaded sleeve 3 constitutes the means of connection between the two outer sleeves whereas the association of a tapered part 6 of an inner jacket with a spherical part 7 of the other inner jacket constitutes the sealing means. The inner and outer jackets and connection 3 are of steel and the threads are machined by conventional means.

FIG. 3 shows another connection according to the invention between two pipes 1 and 2 of composite materials. Each end of pipes 1 and 2 is well equipped with an inner jacket 4 that is adjusted to the inside diameter of the pipe and glued while the outer ends carry bands or jackets that are shrunk-on and glued, one 5' of which is extended by a female jacket 8 equipped with an inner thread pitch and the other 5" is equipped on its outer profile with a male thread pitch able to be screwed into the female thread pitch of jacket 8. This thread constitutes the zone of transmission of forces whereas the association of a tapered part 6 of an inner jacket 4' with a spherical part 7 of the other inner jacket 4" constitutes the sealing means. The inner and outer jackets are of stainless steel, the outer jacket being of ordinary carbon steel and the threads are machined by conventional means.

In the embodiment of the sealing, two methods are available:
 either the insertion of the jacket into the pipe at production with filament winding on said jacket, as in FIG. 2,
 or, after production of the pipe, by addition of the sleeve and gluing of the latter at its end, as in FIG. 3.

I claim:

1. A connection system for connecting together ends of two pipes wherein each of said pipes is made of composite materials and wherein said system comprises:
 a first inner metal sleeve for one of said two pipes wherein said inner metal sleeve has two ends with one of said two ends including a radial lip for projecting around an end of a respective one of said composite pipes and wherein said inner metal sleeve has a bevelled inner surface;

a second inner metal sleeve for another one of said two pipes said second sleeve having a projecting lip with a semi-circular cross-section adapted to sealingly engage the bevelled surface of said first inner sleeve wherein each inner sleeve is adjusted to the inside diameter of each respective pipe and is glued to the inside diameter of said pipe;

an outer metal sleeve for each of said pipes wherein said outer metal sleeve is shrunk-on and glued to the outside of a respective pipe;

a connection means for connecting two of said outer metal sleeves wherein a seal is formed between two pipes due to the seal between two metal inner sleeves which directly abut each other when said two pipes are connected.

2. Connection according to claim 1 in which the means of connection between the two outer sleeves consists of a threaded sleeve whose symmetrical female threads correspond to male threads made on each of the sleeves.

3. Connection according to claim 1 in which the means of connection between the two outer sleeves consists in that a first outer sleeve is extended by a female sleeve equipped with an inner thread pitch and a second outer sleeve is equipped on its outer profile with a male thread pitch able to be screwed into the female thread pitch of the first sleeve.

* * * * *